Sept. 27, 1966          K. DEBUS          3,274,876

APPARATUS FOR SYMMETRICALLY CUTTING A CAST LINE

Filed Oct. 13, 1964          5 Sheets-Sheet 1

INVENTOR
Karl Debus

BY

Michael J. Strikes
ATTORNEY

Sept. 27, 1966 K. DEBUS 3,274,876
APPARATUS FOR SYMMETRICALLY CUTTING A CAST LINE
Filed Oct. 13, 1964 5 Sheets-Sheet 5

FIG. 6

INVENTOR
Karl Debus
BY
Michael J. Striker
ATTORNEY

United States Patent Office
3,274,876
Patented Sept. 27, 1966

3,274,876
APPARATUS FOR SYMMETRICALLY
CUTTING A CAST LINE
Karl Debus, Bad Homburg vor der Hohe, Germany, assignor to Linotype G.m.b.H., Frankfurt am Main, Germany
Filed Oct. 13, 1964, Ser. No. 403,526
Claims priority, application Germany, Oct. 15, 1963,
L 46,049
20 Claims. (Cl. 83—415)

The present invention relates to an apparatus for symmetrically cutting a cast line, or other workpiece, and more particularly to an apparatus for cutting a pair of cast slugs produced in a typecasting machine symmetrically to a line portion formed by characters on both slugs.

When in a typecasting machine, headlines are to be produced, it is necessary to use two or more slugs in end to end relation, since the length of a standard slug is insufficient for the length of the headline which may extend over several columns of the printed text.

In accordance with the prior art, the headline is made by composing the first part in the usual manner for the entire length of a line, whereupon the remaining shorter portion of the headline is composed in a second line. Since the length of the headline is shorter than the combined length of the two lines, the cast slug of the second line has an end piece portion which is cut or sawn off whereupon the two cast slugs are combined. The total length of the combined slugs in end to end relation corresponds to the length of the headline, and is generally smaller than the total space available for the headline, for example the width of two or three columns.

During the composing of a page of the printed text, an extension of the two ends of the combined slugs to the available space corresponding to two columns is required by the prior art. However, it is necessary to estimate the symmetrical position of the headline and to then fill the empty spaces to extend the line in accordance with the available space. If such filling material is not provided at the ends of the line, the headline may be displaced during preliminary operations and not be in the proper center position during the printing. Consequently, in accordance with the prior art, the headline, or more particularly the two cast slugs forming the headline, should be shorter than the available space so that minimum spaces are still available at the end of the headline which can be filled.

It is one object of the invention to overcome the disadvantages of the prior art, and to provide apparatus for symmetrically cutting a cast line.

Another object of the invention is to cut a workpiece symmetrically to the ends of a particular portion of the workpiece.

Another object of the invention is to cut two cast slugs which are in end to end relation, at two points spaced equal distances from the ends of a line of characters on the slugs, or equal distances from a plane of symmetry of characters on the slugs.

Another object of the invention is to center a raised portion formed of characters on a pair of aligned slugs in relation to a pair of cutting members.

Another object of the invention is to compose a line of print in the form of two rows of matrices, and to justify one row of matrices to the right, and the other row of matrices to the left so that none of the two resulting cast slugs is completely made up of characters, and that the two resulting slugs in end to end relation have a line of characters at the inner adjacent ends thereof, and empty parts at the outer ends thereof which can be easily cut to a desired length.

With these objects in view, the present invention relates to an apparatus for symmetrically cutting a workpiece, such as a pair of cast slugs in end to end relation. One embodiment of the invention comprises a support; cutting means including two cutting members spaced in a predetermined direction equal distances from a transverse plane of symmetry; holding means for supporting the workpiece movable in the predetermined direction; and centering means, preferably including a pair of centering members, mounted in a position symmetrical to the plane of symmetry. Operating means are provided for moving the holding means with the workpiece to a position in which the cutting members cut the workpiece.

The centering means engage the workpiece and block movement of the same along the holding means when the workpiece is disposed in a centered position in relation to the cutting members. For example, if the workpiece comprises two slugs in end to end relation which have raised characters at the inner ends forming a raised portion, the centering members engage the ends of the raised portion and thus center the line of characters in relation to the two cutting members so that the cutting members cut off the outer ends of the two slugs at points which are spaced equal distances from the ends of the raised portion of the workpiece, in other words from the ends of a line of characters.

Since the distance between the cutting members corresponds to the space available on the printed page, the line of characters, which may be a headline, is exactly centered on the composed page, for example over two adjacent columns of the printed text.

In the preferred embodiment of the invention, the cutting members are rotary circular saw blades mounted on a common shaft and being movable toward and away from each other which is accomplished by a spindle having opposite threads at the ends thereof cooperating with nuts respectively connected to the saw blades.

The centering device includes a manually turnable pinion cooperating with two rack bars for moving the same in opposite directions, each of the rack bars carrying a centering member. Since the centering members are arranged symmetrical with respect to the same plane of symmetry to which the cutting members are symmetrical, placing of the raised headline portion of the aligned slugs between the centering members, will automatically position the headline portion spaced equal distances from the cutting members or saw blades. The holding means preferably include a pair of clamping members which are movable toward and away from each other between a guiding position and a clamping position. In the guiding position, the two clamping members form a guideway permitting movement of the aligned slugs to a position centered by the centering members, while in the clamping position, the slugs are clamped after they have been centered, and are thus ready to be cut by the cutting members.

It is advantageous to make the clamping members of the holding means of a material which can be easily severed by the saw blades, since in this manner the clamping members can be cut simultaneously with the workpiece.

In the preferred embodiment of the invention, manually operated means are provided for first clamping the workpiece, and for then moving the holding means with the clamped workpiece into the region of the cutting blades.

Since the distance between the cutting members, and the distance between the centering members are independently adjustable, it is advantageous to provide on the centering members stop means which prevent movement of the cutting blades to a position so closely spaced from each other that they may cut into the raised line portion centered by the centering members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
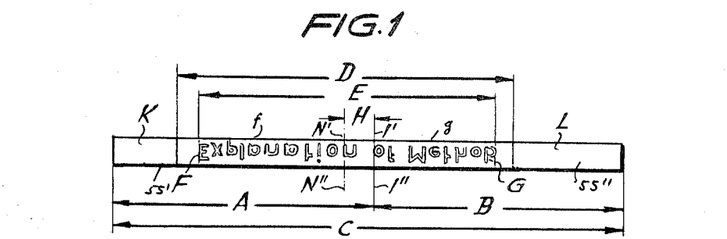
FIG. 1 is a diagram illustrating the position of a pair of aligned slugs which are to be centered in accordance with a line of characters thereon.

Referring now to the drawings, and more particularly to FIG. 1, a pair of slugs $a$ and $b$ cast in a type-casting machine are arranged in end-to-end relation. Slug $a$ has a length A, slug $b$ has a length B, and the combined length of the two slugs is C. Slug $a$ has a raised portion $f$ consisting of characters, and slug $g$ has a raised portion consisting of characters, the two portions $f$ and $g$ forming together a raised portion on the workpiece $a$, $b$ having a length E between the ends F and G of the combined raised portion. The two slugs $a$ and $b$ abut each other in a transverse plane J′–J″. The raised portion between the ends F and G has a plane of symmetry N′–N″. This plane of symmetry is spaced a distance H from the plane of abutment J′–J″.

It is desired to cut the slugs $a$ and $b$ to the available length D symmetrically to the pane N′–N″ and to the ends F and G of the raised line of characters so that end portions K and L are removed.

Assuming that the aligned slugs were first in a position in which the plane of symmetry N′–N″ of the raised characters was located spaced from the center of the distance D, the slugs must be moved to the illustrated position in which the plane of symmetry N′–N″ coincides with the center of the distance D. This distance D corresponds to the spacing of two cutting members so that the same will cut off the slugs symmetrically to the plane of symmetry N′–N″. The cutting members are spaced equal distances from a plane of symmetry M—M, not shown in FIG. 1, but illustrated in FIG. 3 equidistant from the cutting members 15 and 16.

Assuming that the distance D between the cutting members corresponds to 37 Cicero typographical units, the length E of the line of characters corresponds to 32.5 Cicero typographical units, it is necessary to compose the line of two slugs each of which has a length corresponding to 28 Cicero typographical units since a single slug of this length would be insufficient for the length 32.5 of the line of characters, which may be a headline. The total length C of the two slugs $a$ and $b$ corresponds to 56 Cicero typographical units. The portion $f$ of slug $a$ is justified to the right, and the portion $g$ of slug $b$ is justified to the left so that the appearance of the line is in no way influenced by the fact that the line is provided on two abutting slugs. Since empty spaces remain at the ends of the slugs, the justification is very easily accomplished, and a simpler operation than the justification of a slug completely filled with characters, as is necessary in the arrangements of the prior art in which a headline extended over two slugs.

Figure 2:
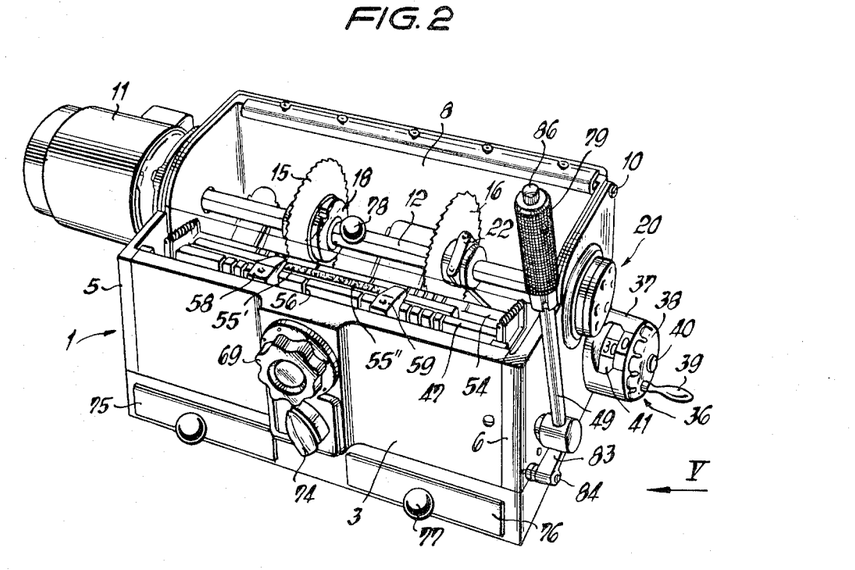
FIG. 2 is a perspective view illustrating an apparatus according to the present invention.
Figure 3:
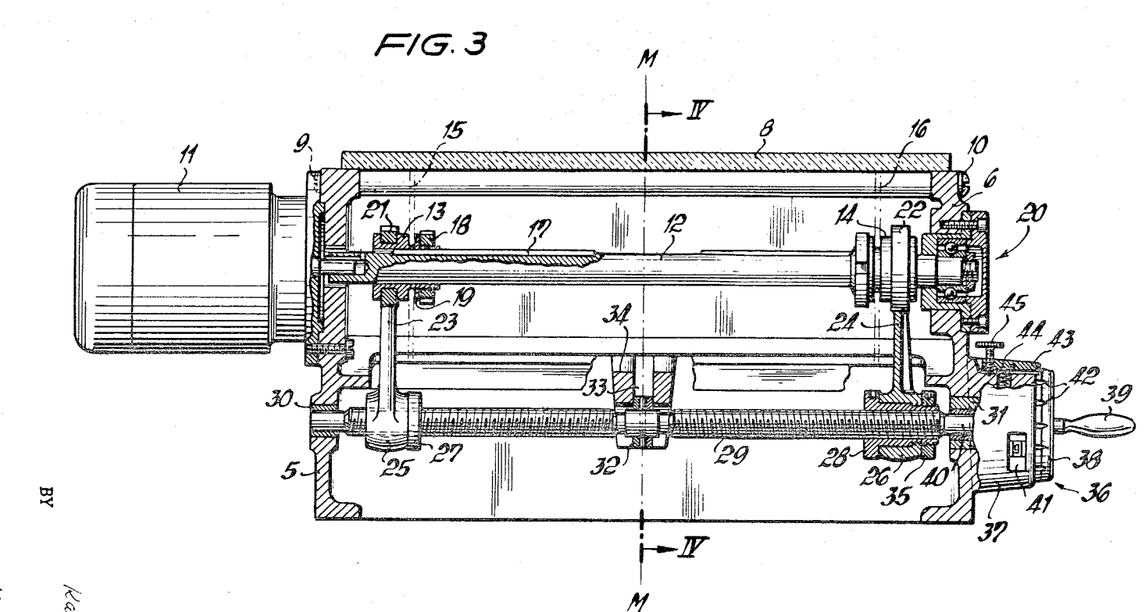
FIG. 3 is a sectional view of the apparatus of FIG. 2 taken on line A–B in FIG. 4.
Figure 4:
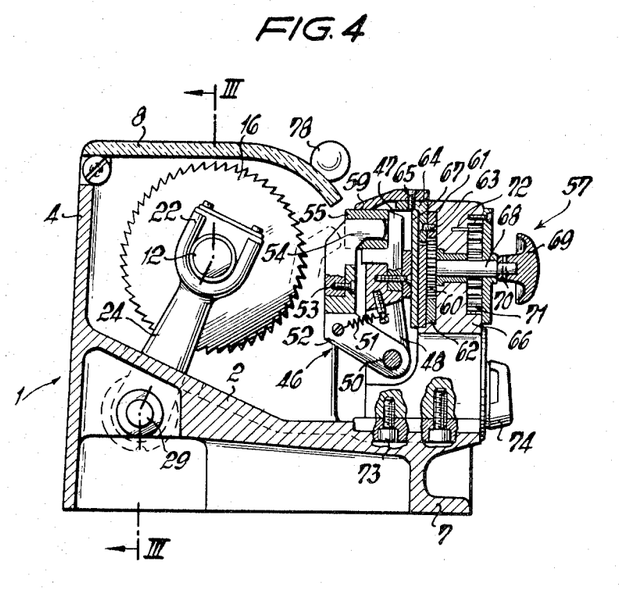
FIG. 4 is a cross-sectional view of the apparatus taken on line C–D in FIG. 3.

Referring now particularly to FIGS. 2, 3 and 4, a casing 1 is composed of a high floor 2, a front wall 3, a back wall 4, and two side walls 5 and 6. Flanged legs 7 are provided for mounting the casing on a table. Drawers 75 and 76 are provided below the floor 2, and can be drawn out by knobs 77, as best seen in FIG. 2. Casing 1 is open on top and closed by a cover 8 consisting of a transparent material and being mounted on pivots 9 and 10 on side walls 5 and 6 for turning movement between an open and closed position. A knob 78 facilitates the rising of cover 8.

An electromotor 11 is supported on side wall 5 and directly drives a shaft 12 whose remote end is mounted in a ball bearing 20 on side wall 6. Two bushings 13 and 14 are mounted on shaft 12 and are connected to the same by keys 17 for rotation, but the keys engage axial grooves in bushings 13 and 14 so that the same are movable on shaft 12 in axial direction toward and away from each other.

Circular saw blades or corresponding cutting members 15 and 16 have central openings and are mounted on bushings 13 and 14, clamped against the same by nuts 18 which are turnable on threaded parts of the bushings, and press washers 19 against the saw blades 15 and 16 so that the same are rigidly secured to bushings 13 and 14, but may be removed and exchanged, if necessary. Each of bushings 13 and 14 has an annular recess. Forked end portions 21 and 22 of a pair of levers 23 and 24 are located in the recesses of bushings 13 and 14. Bushings 27 and 28 are located within the hub portions 25 and 26 of levers 23 and 24. Bushings 27 and 28 have opposite inner threads engaging corresponding opposite threads which are symmetrically arranged on a threaded spindle 29 on opposite sides of a ring 32 secured to spindle 29 and located in a slot 33 of a boss 34 on floor 2 and preventing axial movement of spindle 29.

Bushing 28 also has an outer thread engaged by an inner thread of hub portion 26 and also by a counter nut 35. The threaded connection between bushing 28 and hub portion 26 permits an axial adjustment of lever 24 and thereby of saw blade 16 so that saw blade 16 can be adjusted to be accurately spaced the same distance from a plane of symmetry M—M as saw blade 15.

Due to the fact that the threads at the ends of spindle 29 are opposite, turning of spindle 29 in one direction of rotation will cause movement of levers 23 and 24 toward each other, and turning of spindle 29 in the opposite direction of rotation will move the levers apart from each other. Since the levers control the position of the saw blades 15 and 16, saw blades 15 and 16 will move toward and away from each other, remaining spaced equal distances from the plane of symmetry M—M due to the precise symmetry of the threads on spindle 29.

The spindle is rotated by a device generally indicated by reference numeral 36 including a housing 37 forming part of the casing of the apparatus. A hand wheel 38 is fixedly secured to a smooth cylindrical end portion 40 of spindle 29 and has a handle 39. A gear, not shown, is secured to the spindle portion 40 and drives a conventional counter whose numbers appear in the cutout 41 of the housing 37. The numbers represent typographical units, for example Cicero units.

Hand wheel 38 has along its periphery uniformly spaced notches 42 which cooperate with a catch 43 biased by a spring 44 and tending to snap into any notch 42 which is turned to a position located below catch 43. A manually operated set screw 45 permits blocking of catch 44 in any arresting position so that the blocked catch prevents accidental turning of hand wheel 38 and of spindle 29 when the exact distance between saw blades 15 and 16 has been determined and adjusted. The notches 42 are preferably spaced such a distance in circumferential direction that the saw blades are shifted a distance corresponding to one typographical unit when successive notches 42 are engaged by catch 43.

It is evident that turning of hand wheel 38 will cause turning of shaft 29, axial displacement of levers 23 and 24 toward each other, or away from each other, and finally movement of saw blades 15 and 16 toward each other or away from each other for exactly equal distances so that the saw blades 15 and 16 will be spaced in all adjusted positions equal distances from the plane of symmetry M—M. The distance between saw blades 15 and 16 is the distance D shown in FIG. 1. As explained above, this distance is available for two aligned slugs, and consequently the slugs must be cut off to have a combined length equal to the distance D. In accordance with the available space, the distance between the saw blades 15 and 16 will be adjusted by turning hand wheel 38.

Figure 5:
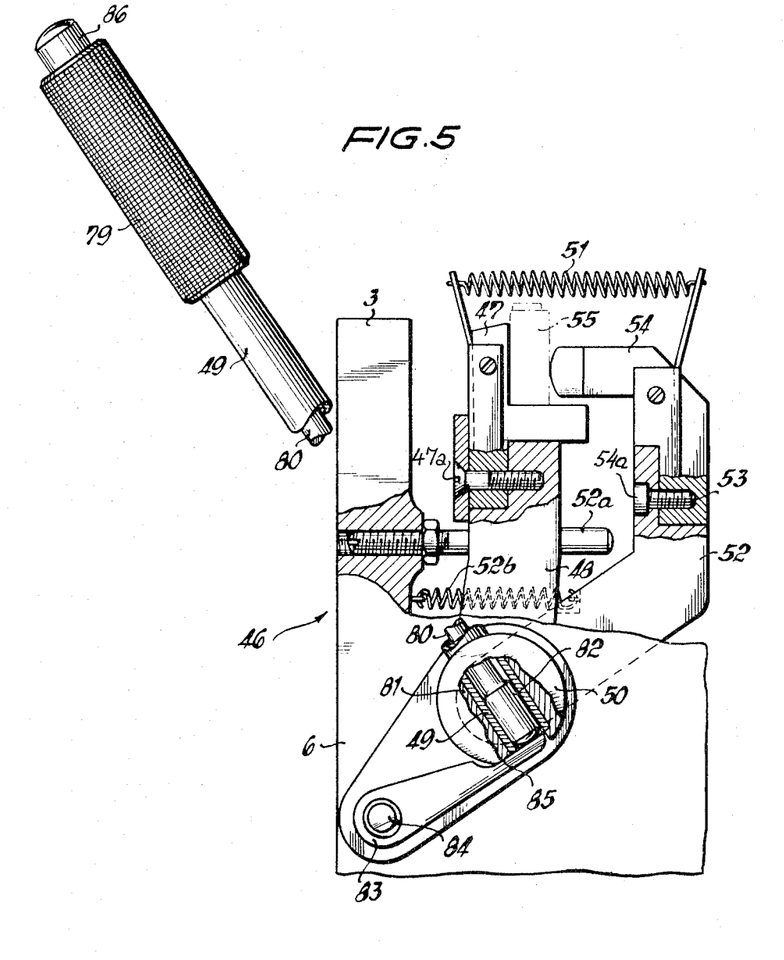
FIG. 5 is a side elevation, partially in section, illustrating on an enlarged scale a lateral portion of the apparatus as viewed in the direction of the arrow C in FIG. 2.

Holding means shown in FIGS. 2, 4 and 5 are provided for supporting a workpiece 55 including two aligned slugs a and b, or 55' and 55".

A shaft 50 is mounted in the side walls of the casing and has a portion 81 projecting out of the casting. A tubular part 49 of a handle 79 projects into a bore of shaft portion 81 and is secured therein, as best seen in FIG. 5. A rod 80 is mounted within the tubular member 49 for longitudinal movement and has an end portion 82 which is normally in the position illustrated in FIG. 5, but which can be advanced against the action of a spring, not shown, by pressure on the upper end portion 86 of rod 80. Shaft portion 81 has a shoulder normally engaged and blocked by spring-loaded pawl 83 so that shaft 50 cannot be turned by handle 79. When the end portion 86 is depressed, the lower end portion 82 pushes pawl 83 away from the shoulder of shaft portion 81 so that the same and shaft 50 can be turned by the operator.

A U-shaped member 48 has a pair of legs secured to shaft 50 and a horizontal portion on which a clamping bar 47 is mounted by means of a screw 47a. Another U-shaped member 52 has legs mounted on shaft 50 for free turning movement. A clamping bar 54 is secured to the horizontal portion of member 52 by screws 54a. Clamping bars 57 and 54 extend parallel to shafts 50 and 12 and have such a shape as to support a workpiece consisting of two aligned slugs 55' and 55". A spring 52b is secured to wall 3 and to a projection on a leg of member 52 and urges the same to turn in counterclockwise direction into abutment with a stop 52a in the form of an elongated pin having a threaded portion inserted into a threaded bore in front wall 3. Another spring 51 is also attached to member 52 and to a screw inserted into the horizontal portion of member 48 and urges the same together with clamping bar 47 to turn in counterclockwise direction toward clamping member 54 so that shaft 50 to which member 48 is secured is urged to turn in clockwise direction to the position illustrated in FIG. 5 in which pawl 43 blocks further turning movement of shaft 50 and of member 48 with clamping bar 47. A workpiece 55 is clamped between clamping bars 47 and 54 by the action of spring 51.

When handle lever 79, 49 is turned in counterclockwise direction toward the front of the casing, member 48 turns against the action of spring 51 and clamping bar 47 moves away from clamping bar 54 which is prevented from turning movement by stop 52a engaging member 52. The clamping bars 47 and 54 are separated and form a guideway in which a workpiece 55 can be placed. Handle lever 79 can be released and is returned by spring 51 together with member 48 and clamping bar 47 to a position clamping the workpiece.

When handle lever 79 is further turned in clockwise direction toward the rear of the casing, member 48 and clamping bar 47 turn in the same direction and turn member 52 by means of the workpiece also in clockwise direction against the action of spring 52b and away from the end of stop 52a. Hand lever 79 is turned until workpiece 55 is engaged and cut by the saw blades 15 and 16 which also cut slits in the upper parts of the exchangeable clamping bars 47 and 54 which consist of a suitable soft material, such as wood.

When hand lever 79 is now released, spring 52b returns members 47, 48, 52, 54 to the position illustrated in FIG. 5, and when handle lever 79 is further turned toward the front of the casing in counterclockwise direction, member 48 moves clamping bar 47 away from clamping bar 55 so that the cut workpiece can be taken out.

As shown in FIG. 2, the upper portions of the clamping bar 47 and 54 have slits 56 which the the result of previous cutting operations. Since the lower portions of the clamping bars are located below the saw blades and are not cut, the clamping bars can be used for several cutting operations. The slugs are indicated by reference numerals 55' and 55" in FIG. 2. As explained with reference to FIG. 1, the workpiece including the slugs 55' and 55" must first be centered before the cutting operation is performed. A centering device is provided for this purpose. A support 66 is secured by screws 73 to the floor wall 2 of the casing, as best seen in FIG. 4. A shaft 68 is mounted in a bearing bushing in support 66 and can be turned by a manually operated knob 69 in opposite directions of rotation. A pinion 60 is secured to shaft 68 and meshes with a pair of rack bars 61 and 62 respectively located above and below pinion 60 so that rack bars move in opposite directions irrespective of a direction of rotation of pinion 60. The cavity in which members 60, 61, 62 are mounted is closed by a cover plate 67 so that the rack bars are guided for sliding movement between cover 67 and the opposite face of support 66. A screw 63 connects each rack bar with an angular bracket 64 to which centering members 58 and 59 are respectively secured by screws 65.

The end portions of the centering members 58 and 59 are positioned to slide on the top face of a workpiece 55, and more particularly on the top faces of the end portions of the slugs 55' and 55". Due to the simultaneous drive of the rack bars 61 and 62 by single pinion 60, the centering members 58 and 59 move either toward or away from each other. Support 66 of the centering device is secured to the floor wall 2 of the casing in such a position that a plane of symmetry between the centering members 58 and 59 is the same plane of symmetry M—M which has been described with reference to FIG. 3. Actually, while the apparatus is designed so that saw blades 15 and 16, as well as centering members 58, 59 are spaced equal distances, respectively, from the plane of symmetry M—M, the position of saw blade 16 is adjusted by the threaded means 28, 26 and 35 so that the desired condition is achieved in which saw blades 15 and 16 and centering members 58, 59 have a common plane of symmetry.

A spiral spring 71 has an inner end secured to shaft 68 of the control means 68, 69 and an outer end secured to a stud in support 66. Spring 71 has the effect of urging the centering members 58, 59 to a spaced position.

Figure 6:
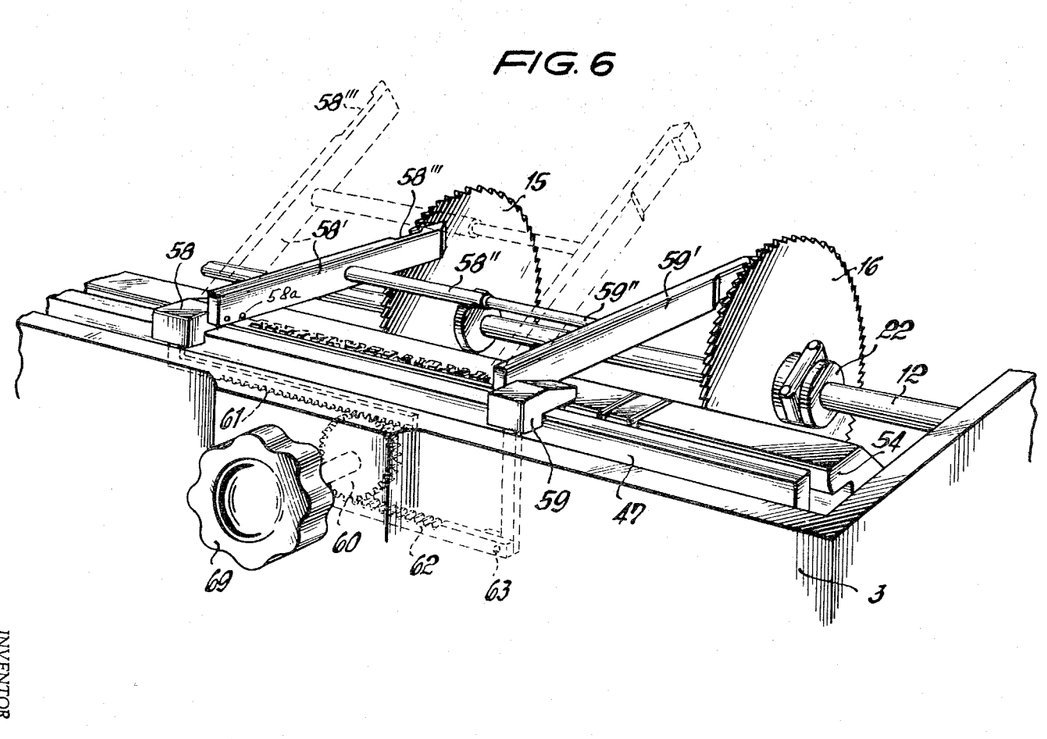
FIG. 6 is a fragmentary schematic perspective view illustrating stops on the centering members for limiting inward movement of the saw blades in the apparatus of FIG. 1.

As shown in FIG. 6, arms 58' and 59' are respectively mounted on centering members 58 and 59 for turning movement in vertical planes and are connected to each other by telescoping members 58" and 59". A stop 58a limits turning movement of arms 58' and 59' in a position in which the same are located between the saw blades 15 and 16. Cutouts 58''' are provided on the outsides of arms 58' and 59' in the region of the peripheral teeth of the circular saw blades 15 and 16 so that the blade can be moved into engagement with arms 58' and 59' without scraping the same.

Assuming that centering members 58 and 59 are in a certain adjusted position spaced a certain distance arms 58' and 59' will assume corresponding positions, and it will not be possible to move the saw blades 15 and 16 by operation of hand wheel 38 farther inward than the position illustrated in FIG. 6 in which the saw blades abut the arms 58' and 59'. So that the saw blades cannot be moved to a position located substantially inwardly of the inner confronting faces of centering members 58 and 59.

A handle 74 is mounted on support 6, as shown in FIGS. 2 and 4, and operates a switch, not shown, by which motor 11 is started and stopped.

Assuming that the saw blades 15, 16 and the centering members 58, 59 are adjusted to have a common plane of symmetry M—M, which is effected by adjustment of the threaded bushing 28 in the threaded hub 26 of lever 24 which supports saw blade 16, hand wheel 38 is turned to rotate spindle 29 so that the opposite threads on the same move levers 23, 24 with saw blades 15 and 16 to a position in which saw blades 15 and 16 are spaced the predetermined distance D, see FIG. 1, which is available for the combined slug 55, and such distance may correspond to the length of two columns of a printed text. During the adjustment of the positions of saw blades 15 and 16, the saw blades remain always spaced equal distances from the plane of symmetry M—M which is equidistant from the inner confronting faces of centering members 58 and 59.

Handle lever 79 is now turned toward the front of the apparatus, which is in counterclockwise direction as viewed in FIG. 5, so that member 42 turns with clamping bar 47 to a position farther spaced from clamping bar 54 which is held in place by stop 52a engaging member 52. The spaced clamping bar 47, 54 form a guideway extending parallel to shaft 12 and rack bars 61, 62, and consequently parallel to the direction of movement of saw blades 15 and 16 on shaft 12 and of centering members 58, 59.

The two slugs 55′ and 55″ are inserted into the guideway between the open clamping members 47, 54 and between the inner confronting faces of centering members 58, 59. When knob 69 is now turned in such a direction that centering members 58, 59 move toward each other, one end of the ends F, G of the raised portion formed by the characters on the aligned slugs, see FIGS. 1 and 2, will be engaged by one of the centering members so that the slugs are pushed to a symmetrical position in which the inner confronting faces of the centering members 58, 59 abut the ends F, G of the raised portion so that the plane of symmetry N′–N″ of the raised portion formed by the characters coincides with the plane of symmetry M—M of the apparatus.

When handle lever 79 is now released, spring 51 turns clamping member 47 to a position clamping workpiece 55, 55′, 55″ against clamping member 54.

Lever 79 is now turned by the operator in clockwise direction as viewed in FIG. 5 toward the rear of the machine so that the clamping members 47, 54 with the workpiece 55 clamped between the same are moved into the region of the circular saw blades 15 and 16 which pass through the upper portions of clamping bars 54 and 57 and also through the workpiece 55 at points spaced exactly equal distances from the planes of symmetry M—M, and N′—N′, and consequently equal distances from the ends F, G of the raised portion formed by the characters on slugs 55′ and 55″. End portions K and L, see FIG. 1 of different length are cut off.

After the workpiece has been cut, handle lever 79 is turned in the opposite direction so that the holding means 48, 52, 47, 54 again assume the position shown in FIG. 5. Further turning of the handle lever 79 toward the front of the apparatus will move clamping bar 47 away from clamping bar 54 against the action of spring 51 since member 52 is blocked by stop 52a. The cut slugs 55′ and 55″ can now be removed from the opened clamping members 47, 54, whereupon spring 51 is permitted to turn handle lever 79 back to its normal position of rest illustrated in FIG. 5 in which the shoulder on shaft portion 81 abuts pawl 83. Before the holding means 48, 47, 54, 52 are turned toward the saw blades, motor 11 is started by operation of switch handle 74 so that the saw blades rotate with shaft 12, and button 86 of rod 80 of handle lever 79 is depressed to move pawl 83 away from the shoulder of shaft portion 81 so that shaft 50 to which member 48 is secured is unlocked and free to turn in clockwise direction as viewed in FIG. 5.

When the centering members 58, 59 are adjusted by operation of control means 68, 69, 60, 61 to a position in which the inner confronting faces thereof abut the ends F, G of the raised portions of slugs 55′ and 55″, arms 58′ and 59′ block inward movement of saw blades 15 and 16 so that when the holding means are moved with the workpiece to the cutting position, the cuts cannot be under any circumstances within the raised portions formed by the characters on the slugs. The normal adjusted position of the saw blades is, of course, spaced from the ends of the raised portions of the slugs since the available space D should be at least slightly greater than the length of the raised portion E. However, when an operator, by mistake, attempts to turn hand wheel 38 to a position in which the distance D between the saw blades 15 and 16 would be smaller than the length E of the lettered portions of the slugs, the blocking arms 58′ and 59′ prevent such undesired operation.

It will be understood that each of the elements described above, or two or more together, may also find a useful application in other types of cutting devices differing from the types described above.

While the invention has been illustrated and described as embodied in an apparatus for cutting two aligned cast slugs symmetrically to the lettered portions on the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for symmetrically cutting a workpiece, comprising, in combination, a support; cutting means including two cutting members spaced in one direction from each other and mounted on said support spaced equal distances from a transverse plane of symmetry; holding means mounted on said support for supporting a workpiece, said holding means being movable on said support in a direction transverse to said one direction; a centering device mounted on said support in a position symmetrical to said plane of symmetry and adapted to engage said workpiece and to block further movement of the same in said one direction when the same is disposed on said holding means in a centered position in which a selected point thereof is located in said plane of symmetry; and operating means for moving said holding means to a position in which said cutting members cut said workpiece equal distances from said selected point thereof.

2. An apparatus for symmetrically cutting a workpiece, comprising, in combination, a support; cutting means including two cutting members spaced in one direction from each other and mounted on said support spaced equal distances from a transverse plane of symmetry, said cutting members being movable in said one direction toward and away from said plane of symmetry; means for moving said cutting members simultaneously equal distances toward and away from each other to positions spaced equal distances from said plane of symmetry; holding means mounted on said support for supporting a workpiece movable in said one direction, one of said means being movable on said support in a direction transverse to said one direction; a centering device mounted on said support in a position symmetrical to said plane of symmetry and adapted to engage said workpiece and to block further movement of the same in said one direction on said holding means in a centered position in which a selected point thereof is located in said plane of symmetry; and operating means for moving said one movable means to a position in which said cutting members cut said workpiece equal distances from said selected point thereof.

3. An apparatus of symmetrically cutting a workpiece having a portion to be centered, comprising, in combination, a support; cutting means including two cutting members spaced in one direction from each other and mounted on said support spaced equal distances from a transverse plane of symmetry; holding means mounted on said support for supporting the workpiece, one of said means being movable on said support in a direction transverse to said one direction; a centering device including two centering members spaced in said one direction and being mounted on said support spaced equal distances from said plane of symmetry, said centering members being adapted to engage the ends of said portion of said workpiece when said portion is disposed on said holding means in a centered position in which said ends of said portion are located spaced equal distances from said plane of symmetry; and operating means for moving said one movable means to a position in which said cutting members cut said workpiece equal distances from said ends of said portion thereof.

4. An apparatus for symmetrically cutting a workpiece having a portion to be centered, comprising, in combination, a support; cutting means including two cutting members spaced in one direction from each other and mounted on said support spaced equal distances from a transverse plane of symmetry, said cutting members being movable in said one direction toward and away from said plane of symmetry; means for moving said cutting members simultaneously equal distances toward and away from each other to positions spaced equal distances from said plane of symmetry; holding means mounted on said support for supporting the workpiece, one of said means being movable on said support in a direction transverse to said one direction; a centering device including two centering members spaced in said one direction and being mounted on said support spaced equal distances from said plane of symmetry, said centering members being adapted to engage the ends of said portion of said workpiece when said portion is disposed on said holding means in a centered position in which said ends of said portion are located spaced equal distances from said plane of symmetry; and operating means for moving said one movable means to a position in which said cutting members cut said workpiece equal distances from said ends of said portion thereof.

5. An apparatus for symmetrically cutting a workpiece having a portion to be centered, comprising, in combination, a support; cutting means including two cutting members spaced in one direction from each other and mounted on said support spaced equal distances from a transverse plane of symmetry, said cutting members being movable in said one direction toward and away from said plane of symmetry; means for moving said cutting members simultaneously equal distances toward and away from each other to positions spaced equal distances from said plane of symmetry; holding means mounted on said support for supporting a workpiece and including first and second clamping members together forming a guideway for the workpiece extending in said one direction, one of said clamping members being movable toward and away from the other clamping member to and from a clamping position; means for operating said one clamping member; one of said means being movable on said support in a direction transverse to said one direction; a centering device including two centering members spaced in said one direction and being mounted on said support spaced equal distances from said plane of symmetry, said centering members being adapted to engage the ends of said portion of said workpiece when said portion is disposed on said holding means in a centered position in which said ends of said portion are located spaced equal distances from said plane of symmetry; and operating means for moving said one movable means to a position in which said cutting members cut said workpiece equal distances from said ends of said portion thereof.

6. An apparatus for symmetrically cutting a workpiece including two cast slugs having raised characters forming a raised portion on said workpiece, comprising, in combination, a support; cutting means including two cutting members spaced in one direction from each other and mounted on said support spaced equal distances from a transverse plane of symmetry; holding means mounted on said support for supporting said cast slugs in end to end relation, one of said means being movable on said support in a direction transverse to said one direction; a centering device including two centering members spaced in said one direction and being mounted on said support spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said one movable means to a position in which said cutting members cut said cast slugs equal distances from said ends of said portion thereof.

7. An apparatus for symmetrically cutting a workpiece including two cast slugs having raised characters forming a raised portion on said workpiece, comprising, in combination, a support; cutting means including two cutting members spaced in one direction from each other and mounted on said support spaced equal distances from a transverse plane of symmetry, said cutting members being movable in said one direction toward and away from said plane of symmetry; manually operable means for moving said cutting members simultaneously equal distances toward and away from each other to positions spaced equal distances from said plane of symmetry; holding means mounted on said support for supporting said cast slugs in end to end relation, one of said means being movable on said support in a direction transverse to said one direction; a centering device including two centering members spaced in said one direction and being mounted on said support spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said one movable means to a position in which said cutting members cut said cast slugs equal distances from said ends of said portion thereof.

8. An apparatus for symmetrically cutting a workpiece including two cast slugs having raised characters forming a raised portion on said workpiece, comprising, in combination, a support; cutting means including two cutting members spaced in one direction from each other and mounted on said support spaced equal distances from a transverse plane of symmetry, holding means mounted on said support for supporting said cast slugs in said one direction and including first and second clamping members together forming a guideway for two cast slugs in end to end relation extending in said one direction, one of said clamping members being movable toward and away from the other clamping member between a guiding position and a clamping position clamping said slugs; means for moving said one clamping member; one of said means being movable on said support in a direction transverse to said one direction; a centering device including two centering members spaced in said one direction and being mounted on said support spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said one movable means to a position in which said cutting members cut said cast slugs equal distances from said ends of said portion thereof.

9. An apparatus for symmetrically cutting a workpiece including two cast slugs having raised characters forming a raised portion on said workpiece, comprising in combination, a support; cutting means including two cutting members spaced in one direction from each other and mounted on said support spaced equal distances form a transverse plane of symmetry; holding means mounted on said support for supporting said cast slugs in end to end relation, one of said means being movable on said support in a direction transverse to said one direction; a centering device including two centering members spaced in said one direction and being mounted on said support spaced equal distances from said plane of symmetry, said centering members being mounted on said support movable toward and way from each other; control means for moving said centering members simultaneously equal distances toward and away from said plane of symmetry to positions spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said one movable means to a position in which said cutting members cut said cast slugs equal distances from said ends of said portion thereof.

10. An apparatus for symmetrically cutting a workpiece including two cast slugs having raised characters forming a raised portion on said workpiece, comprising, in combination, a support; cutting means including two cutting members spaced in one direction from each other and mounted on said support spaced equal distances from a traverse plane of symmetry, said cutting members being movable in said one direction toward and away from said plane of symmetry; manually operable means for moving said cutting members simultaneously equal distances toward and away from each other to positions spaced equal distances from said plane of symmetry; holding means mounted on said support for supporting said cast slugs in end to end relation, one of said means being movable on said support in a direction transverse to said one direction; a centering device including two centering members spaced in said one direction and being mounted on said support spaced equal distances from said plane of symmetry, said centering members being mounted on said support movable toward and away from each other; control means for moving said centering members simultaneously equal distances toward and away from said plane of symmetry to positions spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said one movable means to a position in which said cutting members cut said cast slugs equal distances from said ends of said portion thereof.

11. An apparatus for symmetrically cutting a workpiece including two cast slugs having raised characters forming a raised portion on said workpiece, comprising, in combination, a support; cutting means including two cutting members spaced in one direction from each other and mounted on said support spaced equal distances from a transverse plane of symmetry; holding means mounted on said support for supporting said cast slugs movable in said one direction and including first and second clamping members together forming a guideway for two cast slugs in end to end relation extending in said one direction, one of said clamping members being movable toward and away from the other clamping member between a guiding position and a clamping position clamping said slugs; means for moving said one clamping member; said holding means being movable on said support in a direction transverse to said one direction; a centering device including two centering members spaced in said one direction and being mounted on said support spaced equal distances from said plane of symmetry, said centering members being adapted to engage the ends of said raised portion of said workpiece when the same are disposed on said holding means in a centered position in which said ends of said raised portion are located spaced equal distances from said plane of symmetry; and operating means for moving said moving means to a position in which said cutting members cut said cast slugs equal distances from said ends of said portion thereof.

12. An apparatus as set forth in claim 11 wherein said manually operable means include a spindle having opposite threads at the end portions thereof, a hand wheel for turning said spindle, a pair of bushings having inner threads respectively mounted on said end portions of said spindle and operatively connected with said cutting members for moving the same toward and away from each other when said hand wheel is turned, said cutting members being circular saw blades; and including a shaft supporting said saw blades for turning movement therewith and for axial movement along the same, said shaft being parallel to said spindle and extending in said one direction; and a motor for rotating said shaft.

13. An apparatus as set forth in claim 11 wherein said holding means include a shaft mounted on said support, a first member secured to said shaft for turning movement and supporting said one clamping member, a second member mounted on said shaft for free turning movement and supporting the other clamping member, first spring means connecting said first and second members and urging said first member toward said second member, second spring means connecting said second member with said support, a stop on said support limiting turning movement of said second member so that said first and second spring means urge said first and second members to positions in which said clamping members are in said clamping position.

14. An apparatus as set forth in claim 13 wherein said shaft has a shoulder, said holding means including a spring-loaded pawl engaging said shoulder of said shaft and blocking turning movement of said shaft, wherein said operating means include a hand lever including a tubular member secured to said shaft, and a rod guided in said tubular member and engaging said pawl, said rod being manually operable for releasing said pawl so that said shaft can be turned by said handle lever to a position in which said clamping bars hold said cast slugs clamped in the region of said cutting members.

15. An apparatus as set forth in claim 13 wherein said clamping members are detachably mounted on said first and second members, and consist of a material adapted to be easily cut.

16. An apparatus as set forth in claim 11 and including adjusting means for adjusting the position of one of said cutting members in said one direction so that said cutting members are spaced equal distances from said plane of symmetry which is equidistant from said centering members.

17. An apparatus as set forth in claim 11 wherein said centering means include a pair of rack bars respectively carrying said centering members; and wherein said control means include a manually operable knob, a shaft secured to said knob, and a pinion secured to said shaft and being located between said rack bars meshing with the same for turning the same and thereby said centering members in opposite directions.

18. An apparatus as set forth in claim 17 and including a spring secured to said shaft of said control means and to said support for urging said centering members toward each other.

19. An apparatus as set forth in claim 11 wherein said centering means include a pair of spacing arms respectively mounted on said cutting members and having abutment portions located between said cutting members so that said cutting members are blocked against inward movement in a position located outwardly of the confronting inner surfaces of said centering members whereby cutting of the raised characters on said slugs is prevented.

20. An apparatus as set forth in claim 11 wherein said operating means includes a manually operated member operatively connected to said means for moving said one clamping member so that by operation of said manually operated member said one clamping member can be moved between said guiding and clamping positions, and so that said clamping members in said clamping position can be moved to said position in which said cutting members cut said cast slugs.

References Cited by the Examiner
UNITED STATES PATENTS

| | | | |
|---|---|---|---|
| 786,759 | 4/1905 | Hansen | 83—415 X |
| 1,633,996 | 6/1927 | Narrow | 83—418 |
| 2,056,566 | 10/1936 | Curle et al. | 199—59 |

WILLIAM W. DYER, Jr., *Primary Examiner.*

J. M. MEISTER, *Assistant Examiner.*